United States Patent [19]
Manders

[11] 3,764,896
[45] Oct. 9, 1973

[54] METHOD OF AND DEVICE FOR MEASURING THE LENGTH OF A MAGNETIZABLE TAPE

[75] Inventor: Godefridus Johannes Manders, Oosterhout, Netherlands

[73] Assignee: U.S. Philips Corporation, New York, N.Y.

[22] Filed: Feb. 24, 1972

[21] Appl. No.: 228,870

[30] Foreign Application Priority Data
Mar. 10, 1971 Netherlands................. 7103155

[52] U.S. Cl............................ 324/34 L, 324/34 TA
[51] Int. Cl.............................................. G01r 33/00
[58] Field of Search............ 324/34 R, 34 L, 34 TA; 33/125 C

[56] References Cited
UNITED STATES PATENTS
2,603,688  7/1952  Cole et al.......................... 324/34 R
2,782,515  2/1957  Mayes............................... 324/34 R
3,066,253  11/1962  Bowers............................ 324/34 L

*Primary Examiner*—Robert J. Corcoran
*Attorney*—Frank R. Trifari

[57] ABSTRACT

A method of and a device for measuring magnetic tapes. A tape is first magnetically calibrated by providing on it an uninterrupted pattern consisting of an iterative signal of a fixed wavelength which is divided into block trains by means of a reading head and erasing head controlled by the output signal of the reading head, which heads are placed at an accurately determined mutual distance. The number of block trains is a measure of the length of the tape, while the number of wavelengths per block is constantly compared with a previously determined number and, in the case of a deviation (disturbance), a correction circuit is switched on to inhibit the erase head.

11 Claims, 9 Drawing Figures

METHOD OF AND DEVICE FOR MEASURING THE LENGTH OF A MAGNETIZABLE TAPE

The invention relates to a method of measuring the length of an elongate magnetizable object which is for that purpose conducted past a calibration device and magnetized in the longitudinal direction in places which are located at an accurately predetermined distance in such manner that marks are formed which are then counted.

Such a method of magnetically calibrating and measuring elongate objects of magnetizable material is known, for example, from U.S. Pat. Spec. No. 2,488,277. According to the method described in said specification, the calibration of a steel wire is realized by conducting the wire past an electro magnetic converter (which may be, for example, a writing head) and energizing said device instantaneously by means of a current pulse to start the process of calibration. As a result of this the wire is locally magnetized. In this method, a second electromagnetic converter (which may be, for example, a reading head) is arranged at a fixed distance in the direction of movement of the wire. When the wire is moved and a magnetized part thereof passes the reading head, a voltage pulse is inducted therein. This pulse can then be converted into a current pulse to again energize the writing head, and so on. As a result of this a series of magnetic marks can be provided on the wire at fixed mutual distances. By counting said marks, which can easily be done, for example, by counting the current pulses which energize the writing head, and multiplying the number of counted marks by the fixed distance between the marks (= the distance between the writing and reading head, by which is to be understood the distance between the gaps of the writing and reading head, respectively), it is possible to accurately measure the length of the wire which has passed the measuring device.

The advantage of a magnetic calibration method as described above relative to mechanical measuring methods, in which the number of revolutions of a measuring wheel is counted, which measuring wheel is driven by the object passed along it, is that measuring errors which may occur as a result of slip of the tape of wire to be measured are avoided. It is to be noted that in the manufacturing process of magnetic tapes very high and varying speeds are used as a result of which the said slip of the measuring wheel in mechanical measuring methods can hardly be avoided.

A drawback of the so far known magnetic calibration methods is, however, that disturbances of the magnetic calibration in turn can cause measuring errors.

As a matter of fact, it is possible on the one hand that a magnetic mark is lacking (for example by an electric interference or by the lacking of a piece of the magnetic layer), or that an output signal has been induced in the reading head by one of the magnetic marks, which signal is insufficiently high to energise the writing head for the next mark. This means that in both cases an unknown quantity of tape can pass the measuring device without being calibrated and counted, respectively.

On the other hand it is possible that any interference caused by noise or other causes and detected by the reading head produces a sufficiently large signal to energize the writing head. The result of this is that subsequently too high a number of counting pulses is continuously produced per unit length as a result of which a larger length of tape is measured than has actually passed the measuring device (so-called double counting).

The method according to the invention avoids these drawbacks and is characterized in that a magnetic pattern of block trains is provided on the tape to be measured, one block train consisting of a first block which comprises a pre-determined number of data and of a second block having a principle the same length as the first block but containing no data, the number of block trains being counted for measuring the length of the tape, the number of data per block being counted and compared with a fixed number, the provision of block trains and the counting being interrupted when a difference is found until a fixed minimum length of tape has passed the calibration device. As will be explained in detail, said minimum length should be chosen to be so that the calibration error is as small as possible.

Therefore, according to the invention, a number of data is provided in the blocks, of which the total number is a measure of the length of the object to be measured, so as to be able to signal wrong calibration. After signalling, correction may take place. Since the accuracy of signalling is associated with the number of data per block, a preferred embodiment of the method according to the invention is characterized in that at least 10 and preferably at least 100 data are provided per block.

According to a further preferred embodiment of the method according to the invention, all this can be realized in a particularly efficient manner by providing the data present in a block in the form of an iterative signal having a wavelength which is as much as possible independent of the speed at which the object to be measured is conducted past the calibration device.

Another preferred embodiment of the method according to the invention is characterized in that an iterative signal of the desired wavelength is recorded on the object to be measured in such manner that an uninterrupted magnetic pattern is obtained which is then divided into block trains having a length of 2L by conducting the object to be measured past a reading head and using the signal produced therein to control an erasing head which is placed at a distance L before the reading head, all this in such manner that the erasing head erases as long as a voltage is induced in the reading head.

In this connection it should be noted that if a signal of a given known wavelength could be written with great accuracy on the object to be measured, the division into blocks would no longer be necessary, since in that case the counting only of wavelengths would be sufficient for the measurement. In practice, however, this has proved to be not realisable.

The invention also relates to a device for measuring the length of a magnetisable tape, which device is characterized in that it comprises the following components:

a device to provide on the tape an uninterrupted wavelength pattern of a desired wavelength;

an erasing head;

a reading head placed in the direction of travel of the tape at an accurately pre-determined distance from said head;

a first counting circuit for counting block trains;

a detector and correction device consisting of a second counting circuit for counting the number of wavelengths per block, a digital comparator part for the comparison of a counted number of wavelengths with a fixed standard and a correction part for maintaining the uninterrupted wavelength pattern over a fixed length of tape in the case a number is counted which differs from the standard;

all this in such manner that a signal generated in the reading head controls both the erasing head and the counting circuits.

Since a tape on which an iterative signal has been written passes two magnetic heads in the above-described device, which heads, viewed in the direction of travel of the tape, are arranged after each other and of which the signal of the second head (the reading head) switches the current through the first head (the erasing head), a magnetically calibrated tape is obtained in which the length of the block trains is determined by the mutual distance between the two magnetic heads.

When by some disturbance or other a block train is disturbed, said disturbance would be repeated in the subsequent block trains if no measures were taken, as a result of which wrong counting would occur. As explained above, it is essential for the present invention that the tape be provided with block trains having an information pattern which is constantly read for signalling calibration errors and correcting them. This is realised by using a detection and correction device including a counter which counts the number of data (wavelengths) per block and a correction part which enables the switching off of the first counting circuit and of the control of the erasing head for some time when a disturbance is observed, that is to say, when the number of data in a given block train turns out not to satisfy the required standard, as a result of which the disturbance cannot continue.

A preferred embodiment of the measuring device according to the invention is characterized in that, for reading, a reading head having two or more gaps and channels, respectively, is present in which the gaps are positioned relative to each other and relative to a wavelength pattern to be read in such manner that one signal on the tape can produce several uniform signals which are shifted in phase. In this manner it is possible to obtain a control signal for the erasing head and the counting circuit which is kept "filled" as much as possible. This involves that with an extremely small time constant (without the use of smoothing as would be necessary upon rectification of a signal produced in a reading head having one gap) a direct voltage with a sufficiently small ripple can be obtained. With this voltage a switching transistor can be controlled which in turn controls the current through the erasing head and the counting circuit. For example, the reading head may have $n(n \geq 3)$ gaps and channels, respectively, and be arranged at such an angle relative to the wavelength pattern to be provided on the tape that upon reading the tape a phase shift of 360°/n occurs between the output signals of every two adjacent channels. Monophase rectification will then be sufficient. Fullwave rectification of the read signal must be used when a reading head having $n$ gaps and channels, respectively, is used ($n \geq 2$) which is arranged at such an angle relative to the wavelength pattern that a phase shift of 360°/2n occurs.

It is to be noted that the erasing head in the above-described cases should preferably be arranged relative to the reading head in such manner that the gaps of said heads are parallel so that in the plane of the tape the erasing head is at the same angle as the reading head relative to the modulation to be provided.

In addition to an inclined arrangement of a multi-channel head relative to the wavelength pattern, several other possibilities are feasible to keep the read signal "filled" without having to use smoothing. One such possibility is, for example, to arrange a number of heads which can each read an adjoining part of the tape, slightly shifted (stepwise) relative to each other viewed in the direction of travel of the tape. Technically, however, this is more difficult to perform.

A further preferred embodiment of a measuring device according to the invention is characterized in that the device with which a signal is written on the tape consists of a cylindrical body which can rotate with the tape and on the circumference of which a number of magnetic N and S poles are alternately provided at a fixed mutual distance.

The use of the above-described "print roller" makes it possible to write the tape with a wavelength which is as much as possible independent of the tape speed. The wavelength is determined by the mutual distance of the magnet poles. In order to be able to supply a tape having "a virginal" magnetisable layer, the tape should preferably be conveyed with the support side over the magnet heads and guide rollers associated with the measuring device. This involves that the wavelength to be written should be chosen to be so that upon reading at a distance which corresponds to the thickness of the support, possibly increased by the distance between the tape and the head as a result of dust particles, a pleat in the tape or similar causes, the decrease in reading signal remains below a certain limit (for example 6 dB).

Another preferred embodiment of the measuring device according to the invention is characterized in that the device for writing a signal of a desired wavelength on the tape comprises a writing head which is connected to as oscillator the frequency of which is controlled by a voltage source the output voltage of which is proportional to the tape speed.

This involves that, for example, if the tape speed is increased, the output voltage of the voltage source is also increased, which on turn influences the frequency of the oscillator of the writing head. All this can be constructed so that the wavelength which is written on the tape moving at varying speed maintains a substantially constant value.

The invention will be described in greater detail, by way of example, with reference to the drawing.

Figure 1:
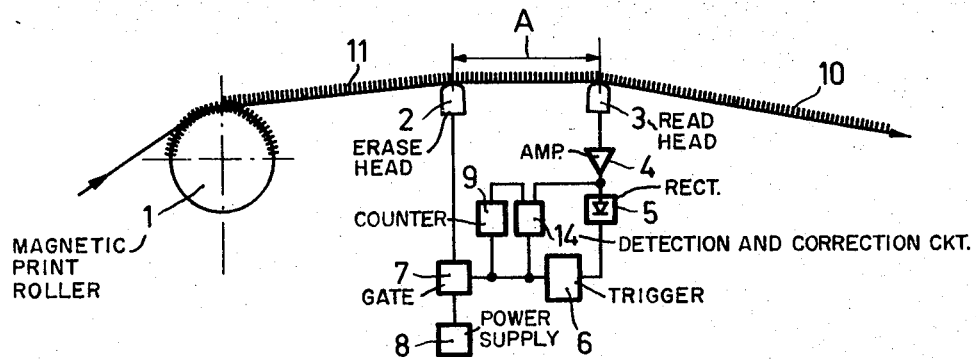
FIG. 1 is a diagrammatic block diagram of a device for measuring tape lengths in which the principles of the invention are embodied.
Figure 2:
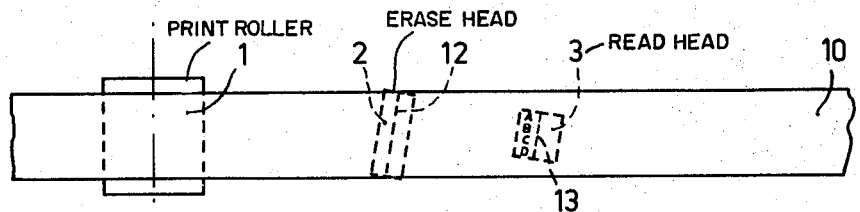
FIG. 2 is a plan view of the device shown in FIG. 1.

FIG. 1 shows in principle in what manner the magnetisable tape 10 is magnetically calibrated and how the calibration is counted. The print roller 1, see FIG. 4, writes a magnetic pattern having a fixed wavelength of, for example 500 $\mu$m (independent of the speed) on the tape. This magnetic pattern 11 passes the erasing head 2 (still switched off at this instant). When the magnetic pattern has reached the reading head 3, the voltage induced therein is amplified via an operational amplifier 4, rectified by a rectifier circuit 5 and supplied to a Schmitt-trigger 6 which for this input signal supplies a direct voltage of a fixed amplitude. Said output voltage controls the switching transistor 7 with which the supply 8 of the erasing head 2 is switched. During the period that the reading head reads the magnetic pattern, the erasing head 2 is switched on. The signal from the Schmitt-trigger 6 also controls a counting circuit 9 which indicates the number of passed block trains. When the distance A between the heads is 50 mm, a block train of 100 mm is formed. It is shown in FIG. 2 that the gaps 12 and 13 of the erasing head 2 and the reading head 3, respectively, extend mutually in parallel and are arranged at an angle relative to the modulation. The reading head 3 has four gaps and channels, respectively, denoted by A, B, C and D, and the inclined arrangement is such that each following channel represents the signal with a phase shift of 90° so that the fourth channel has a phase shift of 270° relative to the first. As a result of the inclined arrangement, always one of the gaps reads a signal having an amplitude above the switching threshold of the Schmitt-trigger, as a result of which the latter each time when changing from an unwritten to a written block, or conversely, is switched at an instant which is defined as accurately as possible. Moreover, when using a multi-channel head having a comparatively large pitch (the track distance) relative to the length of the gaps (the track width), the inclined arrangement need only be small as a result of which the losses occurring due to the inclined arrangement of the gaps relative to the magnetic pattern can be low, for example, less than 1 dB.

The wavelength of the magnetic pattern can be chosen to be so that the decrease in signal upon reading is preferably less than 6 dB. In this case, Westmijze's theorem $55d/\lambda$ = decrease in signal (dB) may be used. For example, at a distance $d$ of 40 microns (= the maximum thickness of the support) and a wavelength of 500 microns, the decrease in signal is less than 5 dB. Moreover the tape can be fully magnetized also from the side of the support when the wave length is 500 $\mu$m. As a result of this the measuring system has a minimum sensitivity to disturbance.

The erasing head 2 should preferably be fed with direct current because when alternating current is used, erasing should be carried out with extremely high frequencies in connection with the very high tape speeds (a few metres per second) occurring in the production process.

Figure 3:
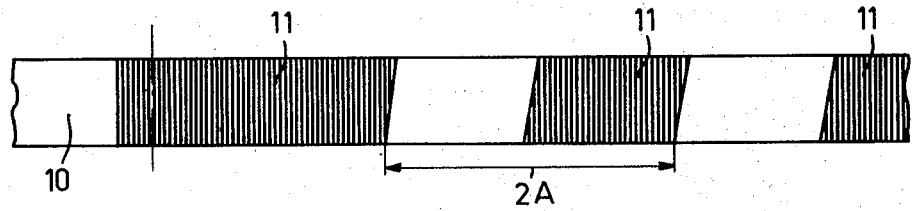
FIG. 3 shows diagrammatically a magnetic tape which is calibrated magnetically, for example, with the device shown in FIG. 1.

FIG. 3 shows a tape having a modulation divided into blocks as it results after the tape has passed the device shown in FIG. 1 and 2, respectively.

Figure 4:
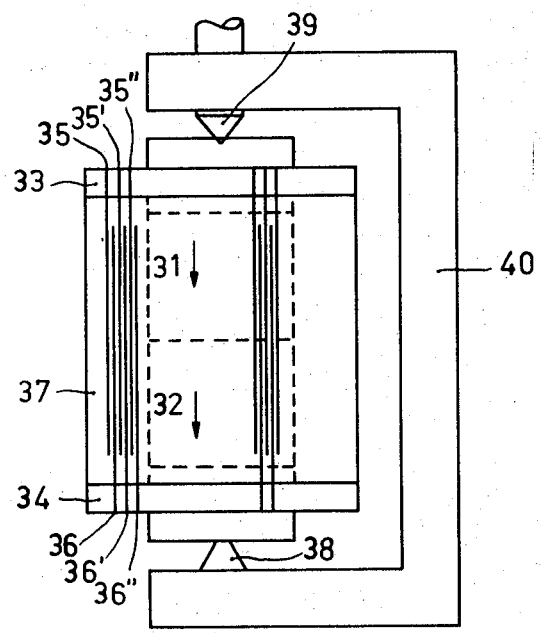
FIG. 4 shows diagrammatically a print roller as is used for providing a magnetic pattern of a fixed wavelength.

FIG. 4 shows the construction of a print roller. The construction consists of two cylindrical permanent magnets 31 and 32, respectively, the magnetisation direction of the respective magnets being indicated by the arrows. A concentric disc 33 of a magnetisable material the diameter of which is considerably larger than that of the magnet is secured to the N pole of the magnet 31. Radial grooves are sawn throughout the circumference of the disc 33, in which grooves plates of magnetisable material 35, 35', 35'', and so on, are secured. In the same manner, the disc 34 of magnetisable material is secured to the S pole of the magnet 32 and plates of magnetisable material 36, 36', 36'' and so on are provided in radial grooves. The plates 35, 35', 35'' and so on just do not reach the disc 34, while the plates 36, 36', 36'' and so on just do not reach the disc 33. The grooves in the disc 34 furthermore are staggered by half a pitch relative to the grooves in the disc 33. The assembly is finished by immersing it in a synthetic resin and, after hardening, working the circumference 37 of the drum to a true cylinder. The print roller is journalled in the points 38 and 39 of the holder 40.

Another possibility of writing a constant wavelength is to use a writing head instead of the print roller. The writing head must in this case be fed by an oscillator voltage the frequency of which is controlled by a direct voltage which is proportional to the tape speed. This can be realised in various manners known to those skilled in the art, for example, by means of a tachodynamo.

The accuracy of the method described is determined by three types of errors:

a. the reading accuracy.

With a block train length of 0.1 metre and a tape length of 100 metres this is 1.0 ‰.

b. the mutual distance of the heads.

This can be adjusted and calibrated, respectively, with an accuracy of ± 0.010 mm, which corresponds to an error of 0.2 ‰.

c. the speed of the electronic circuit with which the erasing head is switched.

At a nominal tape speed of, for example, 125 metres per minute, 2.1 $\mu$m length of tape passes per $\mu$s. A switching speed < 5 $\mu$s which can be realised in practice means that a maximum measuring error of 0.1 ‰ can occur in 100 mm of block train length.

Figure 5:
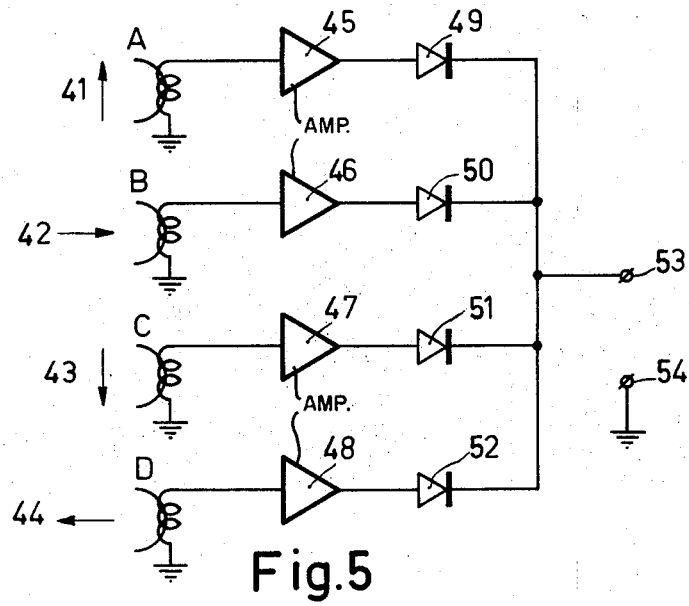
FIG. 5 is a partly diagrammatic diagram of a circuit arrangement which converts the signal read from the tape into a pulsatory direct voltage.

FIG. 5 shows the circuit arrangement which is used in the case in which a 4-channel play-back head the operational gaps of which enclose an angle with the magnetic pattern to be provided on the tape is used for reading the tape (compare FIG. 2). The 4 channels are denoted by A, B, C and D and the phases of the read signals are denoted by the arrows 41, 42, 43 and 44. In the present case the signals read by the respective channels thus are mutually 90° out of phase. The signals are amplified by the amplifiers 45, 46, 47 and 48 and rectified by the diodes 49, 50, 51 and 52. A pulsatory direct voltage which is used to control the Schmitt-trigger appears at the output 53, 54 of the circuit.

The principle of the detection and correction circuit will be described in detail with reference to FIG. 6, 7 and 8.

Figure 6:
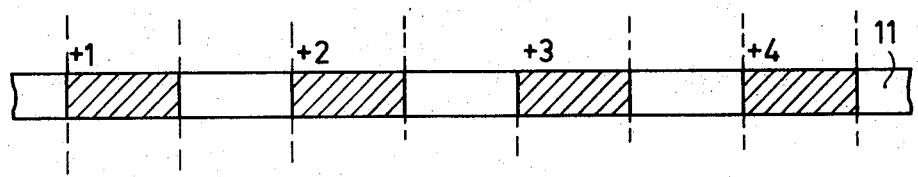
FIG. 6 shows a part of a calibrated tape without disturbances.
Figure 7:
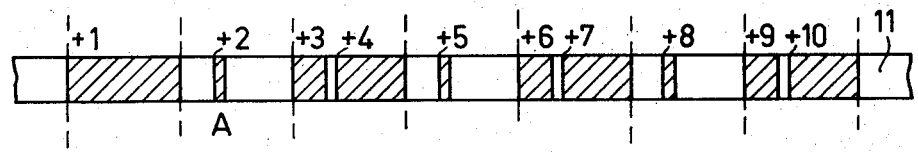
FIG. 7 shows a part of a calibrated tape in which a disturbance has occurred which is not corrected.

FIG. 6 shows a tape 11 the direction of movement of which is to the left and on which a iterative signal of a fixed wavelength of, for example, 500 microns is written and is divided into blocks: written (shaded) and unwritten. With a block length of 50 mm, one block can contain 100 wavelengths. Whether the relevant block has a sufficient length is checked by an electronic counter which counts the number of wavelengths in each written block.

If by any disturbance a block comprises too large a number of wavelengths, and hence is too long, it will be considered good, for it satisfies the standard imposed. Due to the nature of the calibration device, too long a block, however, will not be repeated so that no measures need be taken.

If on the contrary a block is too short by some disturbance, this too short block could be repeated. However, the counter records it as too short and the correction circuit is actuated. The erasing head and block counter are then cut off during the passage of a given length of tape by detection and correction circuit 14 so that the block which is too short can pass without consequences. This cutting off lasts, for example, until the reading head has read 150 wavelengths. This will be explained in detail with reference to FIG. 7 and FIG. 8 in association with FIG. 6.

The vertical (broken) lines have a mutual distance which is equal to the distance between the reading head and the erasing head (50 mm). The position of the reading head should be considered to be left of the position of the erasing head, the tape moving to the left. FIG. 6 shows a tape 11 which is provided with a calibration and in which no disturbance has occurred during calibration. In the cases denoted by +1, +2, +3 and +4 a counting pulse is supplied; so 300 mm of tape has been counted. FIG. 7 shows what happens when a disturbance occurs (A). The disturbance is repeated again and again so that the tape is wrongly calibrated. The result of this is that in the place where in the tape shown in FIG. 6 the fourth counting pulse arrived, the ninth counting pulse now arrives. The counter then incorrectly indicates that 800 mm of tape has passed.

Figure 8:
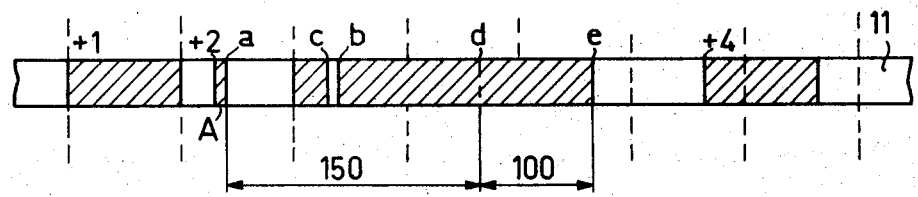
FIG. 8 shows a part of a calibrated tape in which a disturbance has occurred which is corrected.

FIG. 8 shows what happens when a detection and correction circuit is present. The detection circuit records the disturbance A as soon as the end $a$ hereof passes the reading head in that too small a number of wave lengths is counted. The length of the tape between the reading head and the erasing head between $a$ and $b$ has then been calibrated wrongly in the meantime: as a matter of fact there has been erased between $c$ and $b$. At this instant the erasing head is switched off, as well as the block counter, and the circuit starts counting 150 wavelengths. When this has happened, point $d$ of the tape will be at the location of the reading head. At that instant, the erasing head which is 50 mm on the right of the reading head (point $e$) is released. It starts erasing immediately since the reading head sees a written part of the tape. At the same time the counter obtains a counting pulse again. At the beginning of the disturbance (A), the counter has also had a (disturbance) counting pulse. By cutting off the erasing head for 150 wavelengths it is achieved that the fourth counting pulse ultimately comes as near as possible to the (good) fourth counting pulse shown in FIG. 6.

It should be noted that the place where the fourth (and the third, respectively) counting pulse arrives depends only upon the length of the disturbance occurred and is independent of the place of the disturbance within the block.

Figure 9:
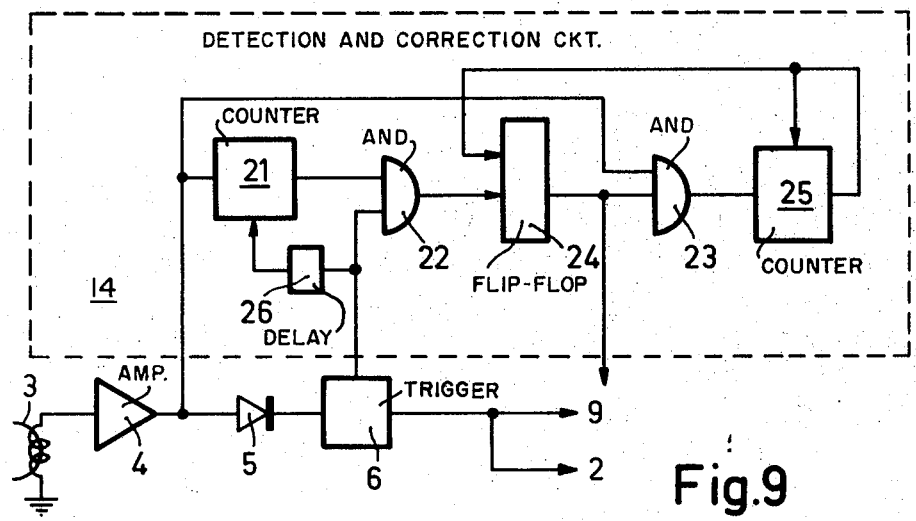
FIG. 9 is a diagrammatic block diagram of a combined counting and regeneration circuit according to the invention.

FIG. 9 shows the detection and correction circuit used in a simplified form. The part of the circuit below the horizontal (broken) line comprises the block writing and counting circuit. In this circuit the output signal of the reading head 3 is amplified by the amplifier circuit 4 and rectified by the rectifier circuit 5. The Schmitt-trigger 6 is switched with the rectified signal and controls in turn the erasing head 2 and the counter 9. In addition, the counter 21 in co-operation with the output signal of the Schmitt-trigger 6 provides an indication as to whether a checked block is long enough. Starting from the fact that for the checking on the one hand at least half of the number of wavelengths per block which can occur maximaly has to be counted and that on the other hand a variation of 10 percent can occur in the wavelength written on the tape and hence in the number of wavelengths per block, a "80" counter is used in the present case. When 80 pulses have been counted, the output 21 has become zero so that when the positive part comes from the Schmitt-trigger 6 (which indicates that the block is finished), nothing happens at the output of the AND gate 22. Box 26 denotes a device which delays the signal passing from 6 to 21. The pulse from the Schmitt-trigger resets the "80" counter 21 again to zero so that same is ready to start checking the next block.

When a disturbance occurs, the "80" counter 21 has not yet reached 80 when the signal comes already from the Schmitt-trigger which indicates that the block is finished. The two inputs of the AND gate 22 then are 1, as a result of which the output also becomes 1. As a result of this the flip-flop 24 is fed and the output hereof becomes 1 so that the AND gate 23 connected after the flip-flop 24 switches the "150" counter 25. This resets itself and the flip-flop as soon as it has reached 150. During counting to 150, the erasing head 2 is cut off by the signal at the output of the flip-flop 24. As soon as the "150" counter 24 resets the flip-flop 24, the erasing head is released again and the error in the calibration is corrected.

What is claimed is:

1. A method of measuring the length of a moving magnetizable object comprising magnetizing said object in spaced blocks of a selected number of data of a selected length, each of said blocks being spaced from each other by said selected length; measuring the length of said object by counting said blocks; counting the data of each block; generating a comparison signal by comparing said counted data with a selected reference number; and interrupting said counting and magnetizing steps when said comparison signal indicates the data in the block is less than the reference number until a selected minimum length of said object has moved passed a selected point.

2. A method as claimed in claim 1 wherein said magnetizing step comprises magnetizing said object with at least ten data units per block.

3. A method as claimed in claim 1 wherein said magnetizing step comprises magnetizing said object with at least one hundred data units per block.

4. A method as claimed in claim 1 wherein said magnetizing step comprises magnetizing said object with a repetitive data signal having a wavelength substantially independent of the speed of said object.

5. A method as claimed in claim 4 wherein said magnetizing step comprises continuously magnetizing said object with said data, dividing said continuous data into said blocks of said selected length by reading said data at a first position to produce a control signal and erasing at a second position spaced by one half of a selected block length from said first position opposite from the direction of travel of said object in accordance with said control signal.

6. A device for measuring the length of an elongate magnetizable moving object comprising means disposed near said object for magnetizing said object with a continuous data pattern having a selected wavelength; an erasing head disposed proximate said moving object; a reading head disposed proximate said moving object at a selected distance from said erasing head in the direction of said object movement; means coupled to said heads for converting said continuous pattern into discrete spaced blocks of a selected length comprising means for supplying an erasing signal to said erasing head upon the occurrence of a signal in said reading head; means for determining the length of said object comprising a first means coupled to said reading head for counting said blocks; and means for detecting and correcting data errors on said object comprising a second means coupled to said reading head for counting said data pattern wavelengths in each of said blocks, means coupled to said second counting means for comparing said counted wavelength number to a selected number, and means coupled to said erase head and said comparing means for disabling said erase head and maintaining said continuous data pattern over a selected length of said object when said numbers differ.

7. A device as claimed in claim 6 further comprising means for producing from said data pattern on said object a plurality of uniform signals having phase shifts of $360°/2n$ with respect to each other comprising said reading head including a plurality of magnetic gaps equal to n and selectively positioned with respect to each other and said object.

8. A device as claimed in claim 6 wherein said magnetizing means comprises a rotating cylindrical body having an outer surface engaging said object and a plurality of alternate polarity magnetic poles disposed about said outer surface at equal selected distances.

9. A device as claimed in claim 6 wherein said magnetizing means comprises a writing head contacting said object, and an oscillator coupled to said writing head and having a frequency proportional to the object speed.

10. A device as claimed in claim 6 wherein said object comprises a magnetic tape.

11. A device as claimed in claim 6 further comprising means for producing from said data pattern on said object a plurality of uniform signals having phase shifts of $360°/n$ with respect to each other comprising said reading head including at least three magnetic gaps equal to n and selectively positioned with respect to each other and said object.

* * * * *